US012770301B2

(12) United States Patent
Revanur et al.

(10) Patent No.: US 12,770,301 B2
(45) Date of Patent: Oct. 20, 2026

(54) PROMPT-BASED IMAGE RELIGHTING AND EDITING

(71) Applicant: Adobe Inc., San Jose, CA (US)

(72) Inventors: Ambareesh Revanur, San Jose, CA (US); Shradha Agrawal, Milpitas, CA (US); Deepak Pai, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 273 days.

(21) Appl. No.: 18/405,925

(22) Filed: Jan. 5, 2024

(65) Prior Publication Data

US 2025/0225697 A1 Jul. 10, 2025

(51) Int. Cl.
*G06T 11/60* (2026.01)
*G06T 11/10* (2026.01)

(52) U.S. Cl.
CPC .............. *G06T 11/60* (2013.01); *G06T 11/10* (2026.01); *G06T 2200/24* (2013.01)

(58) Field of Classification Search
None
See application file for complete search history.

(56) References Cited

U.S. PATENT DOCUMENTS

2018/0061028 A1* 3/2018 Sunkavalli ................ G06T 5/50
2022/0130078 A1* 4/2022 Maheshwari .......... G06V 10/56
2024/0202892 A1* 6/2024 Huang ...................... G06T 5/92
2024/0404011 A1* 12/2024 Maekelae ................. G06T 5/50
2025/0061583 A1* 2/2025 Clever ................. G06V 10/774
2025/0095254 A1* 3/2025 Sietzen ...................... G06T 5/70
2025/0131034 A1* 4/2025 de Juan ................. G06F 16/538
2025/0209796 A1* 6/2025 Pobitzer ................. G06V 10/82

OTHER PUBLICATIONS

Bourke, Paul , "Histogram Matching", Retrieved from the Internet <https://paulbourke.net/miscellaneous/equalisation/>, Jan. 2011, 4 pages.
Gatis, Daniel , et al., "Rembg", Hosted by Github.com [retrieved Mar. 21, 2024]. Retrieved from the Internet <https://github.com/danielgatis/rembg>, 2020, 10.
Song, Yizhi , et al., "ObjectStitch: Generative Object Compositing", Cornell University, arXiv Preprint, arxiv.org, Dec. 2, 2022, 17 pages.

* cited by examiner

*Primary Examiner* — Sarah Le
(74) *Attorney, Agent, or Firm* — FIG. 1 Patents

(57) ABSTRACT

Techniques for prompt-based image relighting and editing are described that support automatic generation of an edited digital image with high-fidelity and realistic lighting effects and background features. A processing device, for instance, receives as input a digital image that depicts a digital object, a lighting prompt, and a background prompt. The processing device generates a relit digital object that has a lighting condition specified by the lighting prompt applied to the digital object. The processing device further generates a background that includes a feature specified by the background prompt and the lighting condition. The processing device generates an edited digital object for output that includes the relit digital object and the background. The processing device further leverages a shadow synthesis model to edit shadows in the edited digital image. In this way, the techniques described herein preserve content details of the digital object when applying background and lighting effects.

20 Claims, 12 Drawing Sheets
(7 of 12 Drawing Sheet(s) Filed in Color)

PROMPT-BASED IMAGE RELIGHTING AND EDITING

BACKGROUND

Image processing systems support a variety of functionality to create and edit digital images. For instance, content creators often use manual image editing techniques to apply visual effects to digital images, such as to alter a background of an underlying image. Tasks such as editing backgrounds involve meticulous manipulation of a variety of image aspects, and as such these techniques are time consuming and reliant on expertise of the content creators. Recently, machine learning approaches have been applied to automate image editing tasks. However, these approaches face a myriad of issues related to image fidelity, user and computational efficiency, and image realism.

SUMMARY

Techniques for prompt-based image relighting and editing are described that support automatic generation of a high-fidelity edited digital image with realistic lighting effects and background features. In an example, a processing device receives as input a digital image that depicts a digital object and a prompt. The prompt specifies a lighting condition as well as a background condition to be applied to the digital object. The processing device then generates a relit digital object that has the lighting condition applied to the digital object. To generate the relit digital object, the processing device removes a background from the digital image and generates a lighting example image that has the lighting condition applied to a coarse representation of the digital object. Using the lighting example image, the processing device then implements a histogram matching approach to restore content details to the digital object and generate the relit digital object.

The processing device further generates a background that includes one or more features specified by the prompt based on the background condition as well as on the relit digital object. For instance, the processing device generates the background in accordance with the lighting condition of the relit digital object. The processing device generates an edited digital object for output that includes the relit digital object and the background. In this way, the techniques described herein preserve content details of the digital object when applying various background and lighting effects to generate edited digital images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
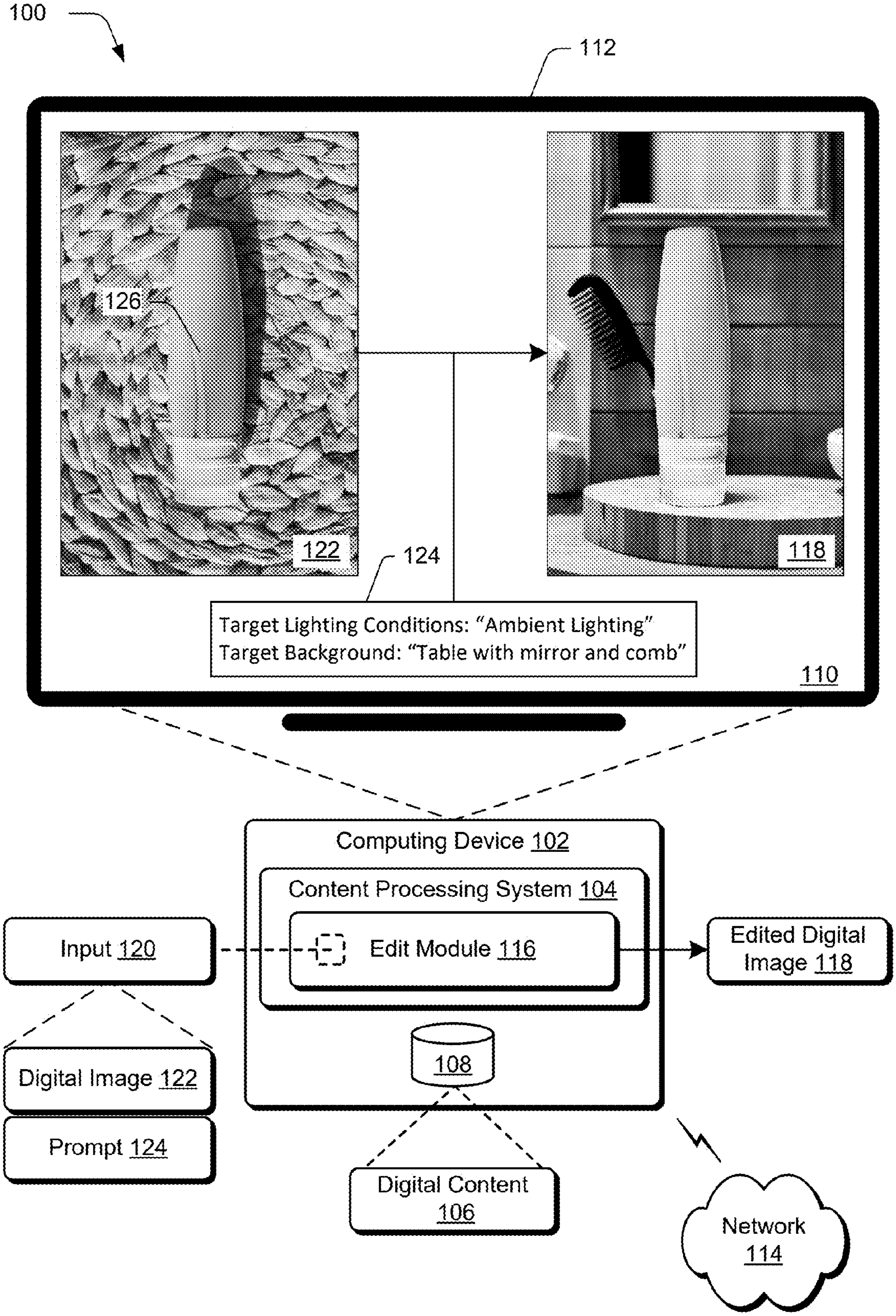
FIG. 1 is an illustration of a digital medium environment in an example implementation that is operable to employ the prompt-based image relighting and editing techniques described herein.

Image processing systems often utilize a variety of tools and techniques to perform image creation and editing operations. For instance, image processing systems leverage text-based image editing techniques to receive a text string and modify a digital image based on the text string. Recently, generative artificial intelligence (AI) techniques have been developed and implemented to enhance the ability of image processing systems to edit images based on textual descriptions. However, conventional generative AI editing techniques face a myriad of issues related to image fidelity and generating consistent lighting conditions.

Consider an example to add a new background to a picture that includes a digital object. Conventional techniques to do so prevent alteration to the digital object during generation of the new background. However, this leads to unrealistic images with mismatched lighting conditions between a foreground, e.g., the digital object, and the background. Other conventional techniques are dependent on multiple input images that depict the digital object from different angles, however these techniques are computationally expensive and are unable to preserve fine details of the digital object, which limits the utility of such approaches.

Accordingly, techniques and systems for prompt-based image relighting and editing are described that support comprehensive editing of a digital object within an input digital image to apply a variety of lighting and background conditions while maintaining fidelity of the digital object. Consider an example in which a user is designing an advertisement for a car and wishes to edit an image of the car to have a target background and a target lighting condition, such as to depict the car on a mountain road at sunset.

Some conventional approaches attempt to depict the car within the target background using inpainting and outpainting techniques. However, these techniques prevent alterations to the underlying image, e.g., the car, and thus generate unrealistic images that have mismatched lighting conditions between foreground and background. Other conventional approaches involve fine-tuning machine learning models. However, these approaches are computationally expensive and rely on multiple training images of the car which is impractical in various scenarios. Further, conventional approaches often distort fine details of the underlying image and incorrectly render text, logos, textures, shape details, etc.

To overcome these limitations, a processing device implements a content processing system to receive an input digital image that includes a digital object and a prompt that includes a lighting prompt and a background prompt. In this example, the input digital image depicts the car (i.e., the digital object) in a parking lot. The car has a particular shape and style, as well as a logo that includes text. The prompt in this example is a text-based prompt generated by the user to display the car "at sunset on a mountain road." Accordingly, the text-based prompt includes a lighting prompt that specifies a lighting condition, e.g., "sunset," and a background prompt that specifies a background condition, e.g., "mountain road," to be applied to the digital object.

The content processing system removes a background from the input digital image to extract the digital object. Continuing with the above example, the content processing system removes the background that depicts the parking lot to generate an image that depicts only the car. The content processing system then leverages an artificial intelligence-based diffusion model to "relight" the image of the car to generate a lighting example image that depicts a representation of the car with the lighting condition, e.g., a "sunset" lighting condition, applied. The diffusion model, for instance, generates the lighting example image by adjusting one or more visual factors (e.g., brightness, intensity, color temperature, direction and/or angle of light sources, highlights, reflections, material properties, etc.) of the digital object to simulate the target lighting conditions.

However, while the diffusion model is effective to generate and apply the lighting condition, in some examples the lighting example image generated by the diffusion model includes one or more visual artifacts such as distorted content details. For instance, the lighting example image distorts the text included in the representation of the car. That is, the lighting example image is relatively "low-quality" relative to the image of the car, which retains content details from the input digital image. Accordingly, the content processing system is operable to restore content details to the digital object using a histogram matching operation.

To do so, the content processing system calculates a first cumulative distribution function for the image of the car and a second cumulative distribution function for the lighting example image. The first and second cumulative distribution functions, for instance, represent pixel intensities of the respective images. Accordingly, the content processing system "matches" the distributions by generating a mapping between the first cumulative distribution function and the second cumulative distribution function. Based on the mapping, the content processing system transfers a color profile from the lighting example image to the image of the car. In this way, the content processing system is operable to generate a relit digital object that has the lighting conditions of the lighting example image applied to a high-fidelity representation of the digital object, which overcomes conventional limitations that either prevent edits to the underlying image or distort content details of the underlying image.

The content processing system then generates a background based on the background prompt, e.g., that specifies a "mountain road" background condition, as well as based on the relit digital object. For instance, the content processing system leverages a generative fill model to generate a background that has one or more features of the background prompt while respecting the lighting conditions of the relit digital object. By considering features of the relit digital object as well as the background prompt, the techniques described herein overcome limitations of conventional techniques that generate images with lighting disparities between background and foreground.

In this way, the content processing system generates an edited digital image that depicts the relit digital object within the background. For instance, the edited digital image depicts the car on a mountain road with lighting conditions associated with sunset. The edited digital image further retains fine details of the input digital image without distortion, such as the particular shape and style of the car, as well as the text of the logo. In some examples, the content processing system further leverages a shadow synthesis model to increase realism of the edited digital image by editing one or more shadows present in the edited digital image. Accordingly, the techniques described herein support automatic generation of high-fidelity images with realistic lighting, background, and shadowing features which is not possible using conventional techniques. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Term Examples

As used herein, the term "lighting prompt" refers to an input that specifies a lighting condition to be applied to a digital object. In one or more examples, the lighting prompt specifies one or more of a type, intensity, location, number, color, direction, and/or quality of the lighting condition to be applied to the digital object.

As used herein, the term "background prompt" refers to an input that specifies a background condition and/or one or more features to include in a scene with the digital object. For instance, the background prompt specifies one or more objects, locations, geographical/environmental features, animals, individuals, color palettes, textures, depth of field, perspective, style, scale, atmosphere, composition, tone, weather, time of day/year, etc. to include in the scene.

As used herein, the term "lighting example image" refers to an image generated by a diffusion model to apply a lighting condition to a coarse representation of a digital object. In some examples, the lighting example image represents a "low-resolution" representation of the digital object with the lighting condition applied.

As used herein, the term "relit digital object" refers to a digital object that has a lighting condition specified by a lighting prompt applied. The relit digital object, for instance, maintains fine details of the digital object, such as particular shapes, text, logos, etc., while including the lighting condition. In various examples, the relit digital object has a higher resolution than a lighting example image.

As used herein the term "histogram matching operation" refers to an approach that is used to transfer a color profile from a first image, such as a lighting example image, to a second image, such as an image of the digital object. In various examples, the histogram matching operation is used to generate the relit digital object.

As used herein, the term "shadow synthesis model" refers to a machine learning model that is operable to edit, add, and/or remove one or more shadows from an image. In an example, the shadow synthesis model is operable to increase or decrease a brightness of a shadow, adjust contrast between shadowed and non-shadowed areas, adjust a color of a shadow, account for multiple light sources within a scene, account for multiple objects within a scene, etc.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the prompt-based image relighting and editing techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory components and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as an edit module 116. The edit module 116 is configured to generate an edited digital image 118 based on an input 120 that includes a digital image 122 and a prompt 124. Generally, the digital image 122 depicts a digital object 126 and the prompt 124 specifies a lighting condition and/or a background condition to be applied to the digital object 126. For instance, in the illustrated example the edit module 116 receives a digital image 122 that depicts a tube of toothpaste on a woven placemat. In this example, the tube is representative of a digital object 126. The tube is illuminated in the digital image 122 by a directional light source that is directed at the front of the tube, such that a shadow is depicted "behind" the tube on the woven placemat.

The edit module 116 further receives a prompt 124, which in this example includes a target lighting condition of "ambient lighting" and a target background condition of a "table with mirror and comb." Based on the digital image 122 and the prompt 124, the edit module 116 is operable to generate the edited digital image 118 that includes the digital object under the target lighting conditions with a background based on the target lighting conditions and the target background conditions. For instance, the tube is depicted with ambient lighting conditions applied in a scene with a table, mirror, and comb in the background.

As illustrated, the edit module 116 generates the edited digital image 118 to preserve fine details of the digital object 126, e.g., subtle contours and shapes of the tube, while including congruous lighting conditions between the background and the digital object 126. That is, the lighting applied to the tube and the background depicting the table, mirror, and comb is consistent and realistic. This is not possible using conventional techniques that prevent alteration to digital objects while inserting them into new scenes and/or distort object details when editing. The techniques described herein further overcome limitations of conventional techniques that are computationally expensive and/or are reliant on multiple input images. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Prompt-Based Image Relighting and Editing

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9 in parallel with FIG. 10 that depicts a flow diagram depicting an algorithm as a step-by-step procedure 1000 in an example implementation that is performable by a processing device to generate an edited digital image and FIG. 11 that depicts a flow diagram depicting an algorithm as a step-by-step procedure 1100 in an example implementation that is performable by a processing device to generate a relit digital object.

Figure 2:
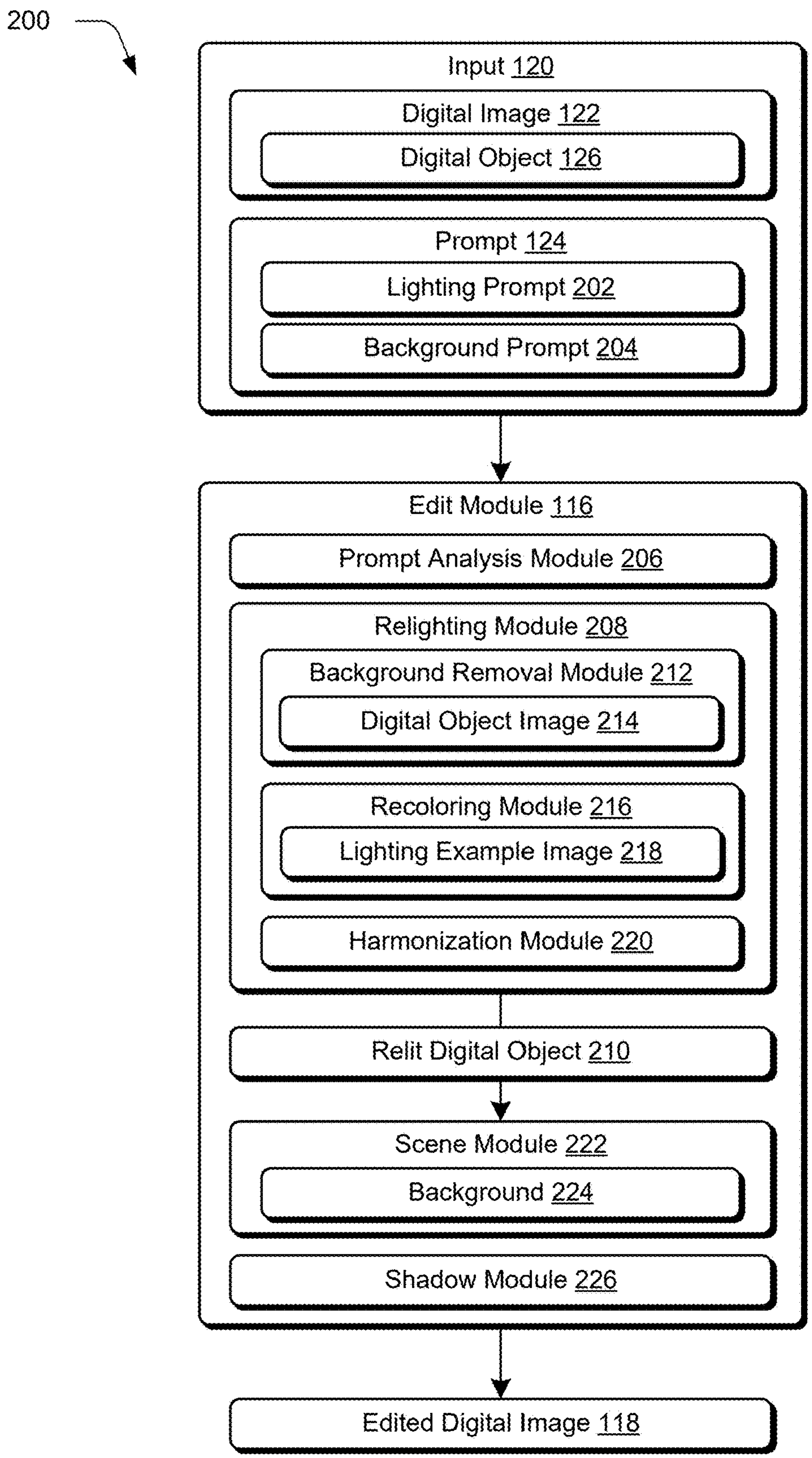
FIG. 2 depicts a system in an example implementation showing operation of an edit module in greater detail.

FIG. 2 depicts a system 200 in an example implementation showing operation of an edit module 116 in greater detail. Generally, the edit module 116 is operable to apply a lighting condition and/or a background condition specified by a prompt 124 to a digital object 126 to generate an edited digital image 118.

In an example, the edit module 116 receives an input 120 that includes a digital image 122 and a prompt 124 (block 1002). The digital image 122 includes one or more digital objects, such as a digital object 126 within a scene depicted by the digital image 122. It should be understood that while in this example the digital image 122 is depicted as a single image, in various examples the digital image 122 is representative of a variety of digital content 106 such as multiple digital images, digital video, AR/VR content, etc.

Generally, the prompt 124 represents an input that includes a lighting prompt 202 and/or a background prompt 204. A lighting prompt 202, for instance, specifies a lighting condition to apply to the digital object 126 while the background prompt 204 specifies a background condition and/or one or more features to include in a scene with the digital object 126. In an example, the prompt 124 is received as a text input, e.g., as a text string input by a user in a user interface 110.

Alternatively or additionally, the prompt 124 is received as one or more of a voice input, user selection such as by selecting predefined options, reference image input, etc. In one example, the prompt 124 is generated automatically and without user intervention based on a reference image. For instance, the prompt 124 is generated to include a lighting condition and a background condition present in the reference image.

In some examples, the edit module 116 includes a prompt analysis module 206 that is operable to receive an input such as a text string and generate, automatically and without user intervention, a lighting prompt 202 and a background prompt 204 based on the text string. In another example, the prompt analysis module 206 is operable to receive one or more keywords and generate the prompt 124 based on the keywords such as by leveraging one or more language models.

Figure 3:
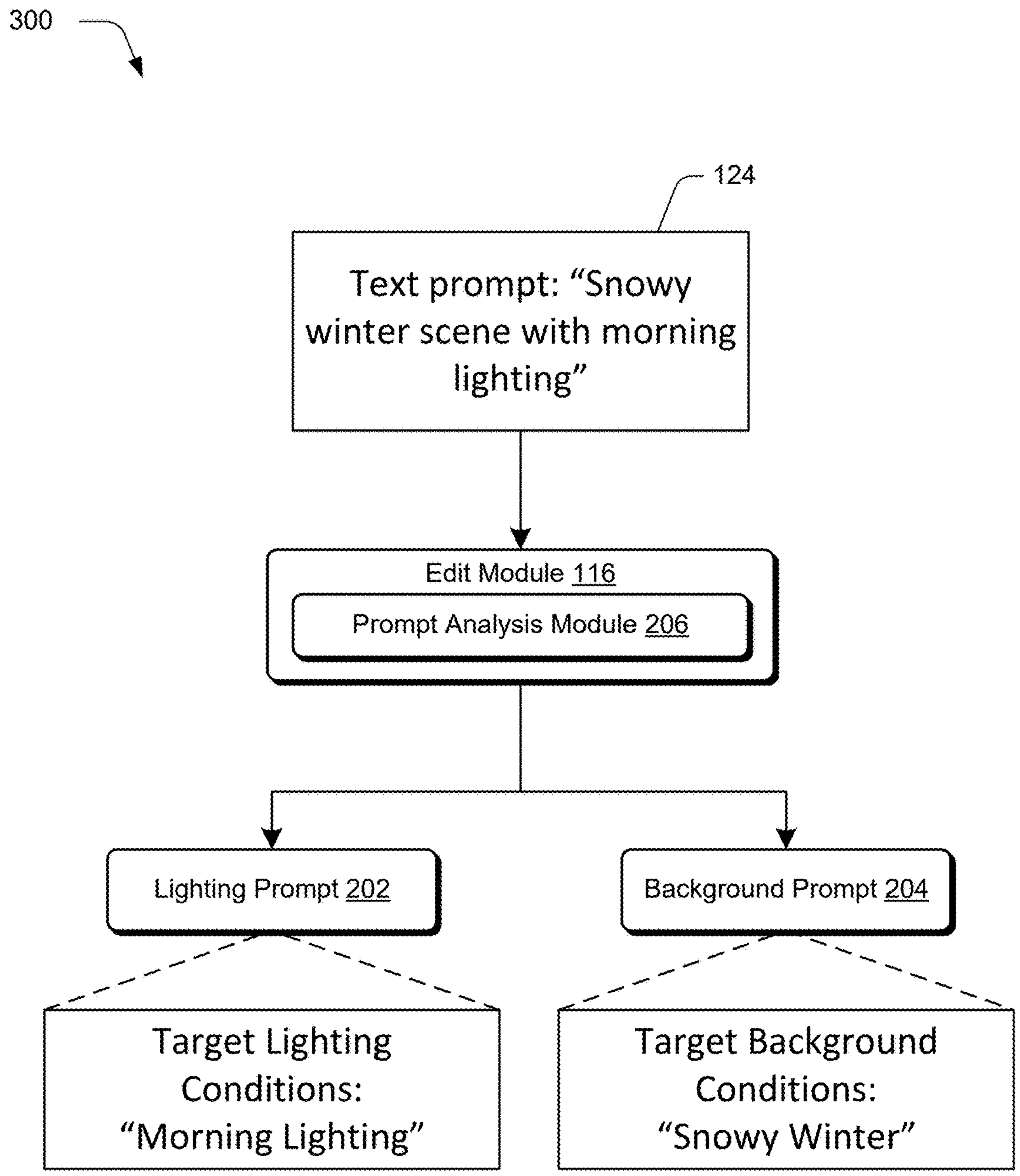
FIG. 3 depicts an example of generating a lighting prompt and a background prompt based on an input prompt.

FIG. 3 depicts an example 300 of generating a lighting prompt 202 and a background prompt 204 based on the prompt 124. In this example, the edit module 116 receives a prompt 124 that includes a text string that recites "snowy winter scene with morning lighting." The prompt 124, for instance, represents conditions to be applied to a digital image 122, as further discussed below.

The edit module 116 leverages the prompt analysis module 206 to analyze the prompt 124 to generate a lighting prompt 202 and a background prompt 204. In this example, the prompt analysis module 206 leverages one or more text analysis modalities (e.g., one or more text analysis machine learning models and/or algorithms) to parse the prompt 124 into the lighting prompt 202 and the background prompt 204. For instance, the prompt analysis module 206 generates the lighting prompt 202 to include "morning lighting" conditions and the background prompt 204 to include "snowy winter" background conditions and features.

Further, the prompt analysis module 206 is operable to qualify the lighting prompt 202 on the background prompt 204, as well as qualify the background prompt 204 on the lighting prompt 202. For instance, the prompt analysis module 206 is operable to generate associations between individual words, pairs of words, and/or strings of text within the prompt 124 to accurately represent lighting conditions and/or background conditions. For instance, the prompt analysis module 206 qualifies the lighting condition of "morning lighting" based on the background condition of "snowy winter." In an example, the prompt analysis module 206 qualifies the lighting condition of "morning lighting" differently with a background condition of "snowy winter" than with a background condition of "sunny beach." In this way, the techniques described herein are able to accurately represent lighting and background conditions of a variety of scenarios and prompts 124.

Continuing with the example in FIG. 2, the edit module 116 includes a relighting module 208 that is operable to generate a relit digital object 210 (block 1004). Generally, the relit digital object 210 depicts the digital object 126 under the lighting conditions specified by the lighting prompt 202. The relit digital object 210 is further of a same or similar resolution as the digital image 122.

Figure 11:
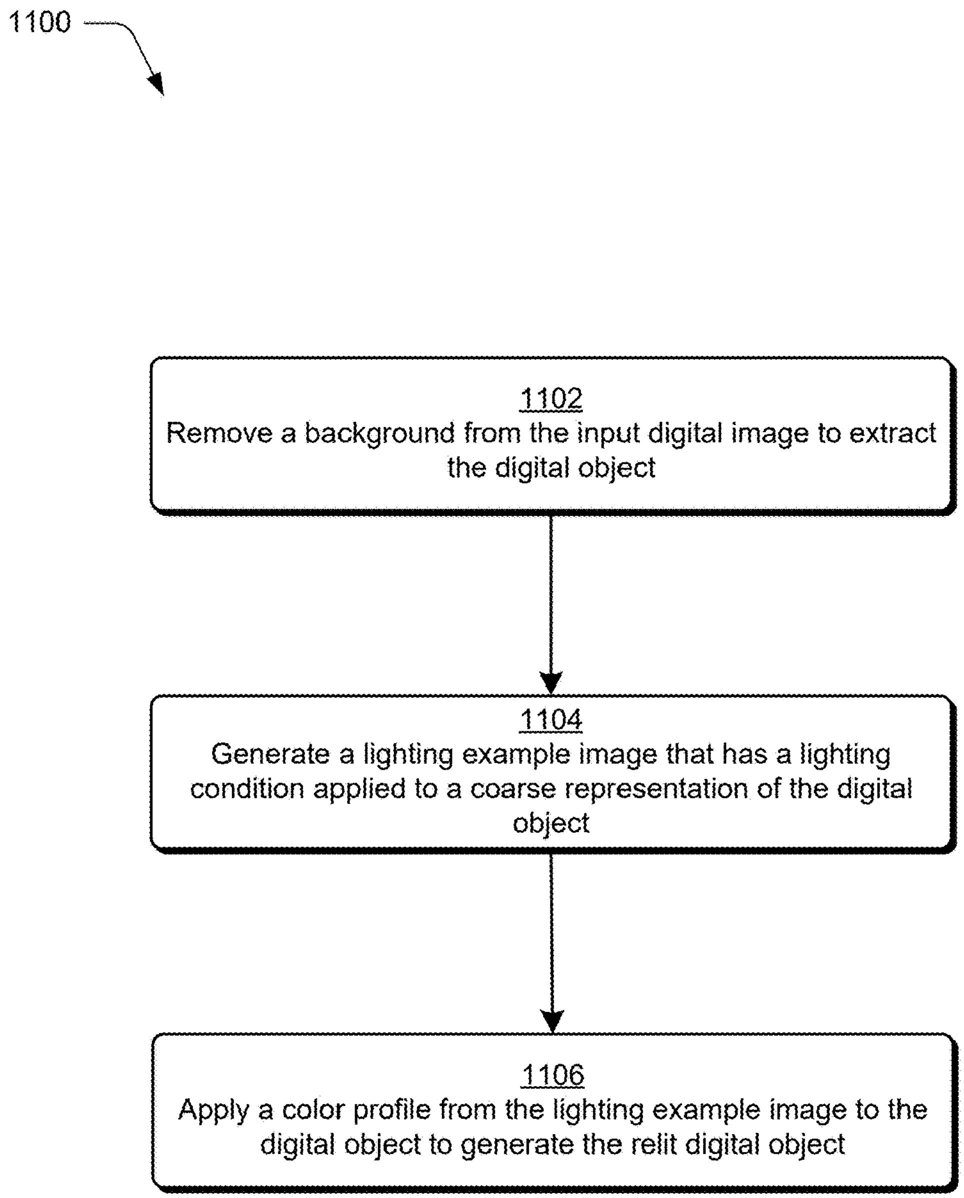
FIG. 11 is a flow diagram depicting an algorithm as a step-by-step procedure in an example implementation that is performable by a processing device to generate a relit digital object.

FIG. 11 is a flow diagram depicting an algorithm as a step-by-step procedure 1100 in an example implementation that is performable by a processing device to generate the relit digital object 210. In various implementations, one or more steps of the procedure 1100 are performed as substeps of block 1004 of the procedure 1000. To generate the relit digital object 210, the relighting module 208 includes a background removal module 212 that is operable to remove a background from the digital image 122 to extract the digital object 126 (block 1102). In one or more examples, the extracted digital object 126 is represented as a digital object image 214 that depicts the digital object 126 with the background of the digital image 122 removed.

The background removal module 212 is operable to leverage one or more of a variety of tools, algorithms, models, and/or techniques to extract the digital object 126. In one example, the background removal module 212 leverages one or more image background removal tools, such as a Python rembg package. Alternatively or additionally, the background removal module 212 leverages one or more instances of image editing software, deep learning models, open-source functions, algorithms, etc. This is by way of example and not limitation, and a variety of background removal modalities are considered. In some examples, the background removal module 212 determines a modality to remove the background based on computational resource availability of the computing device 102, such as to conserve computational resources.

Figure 4:
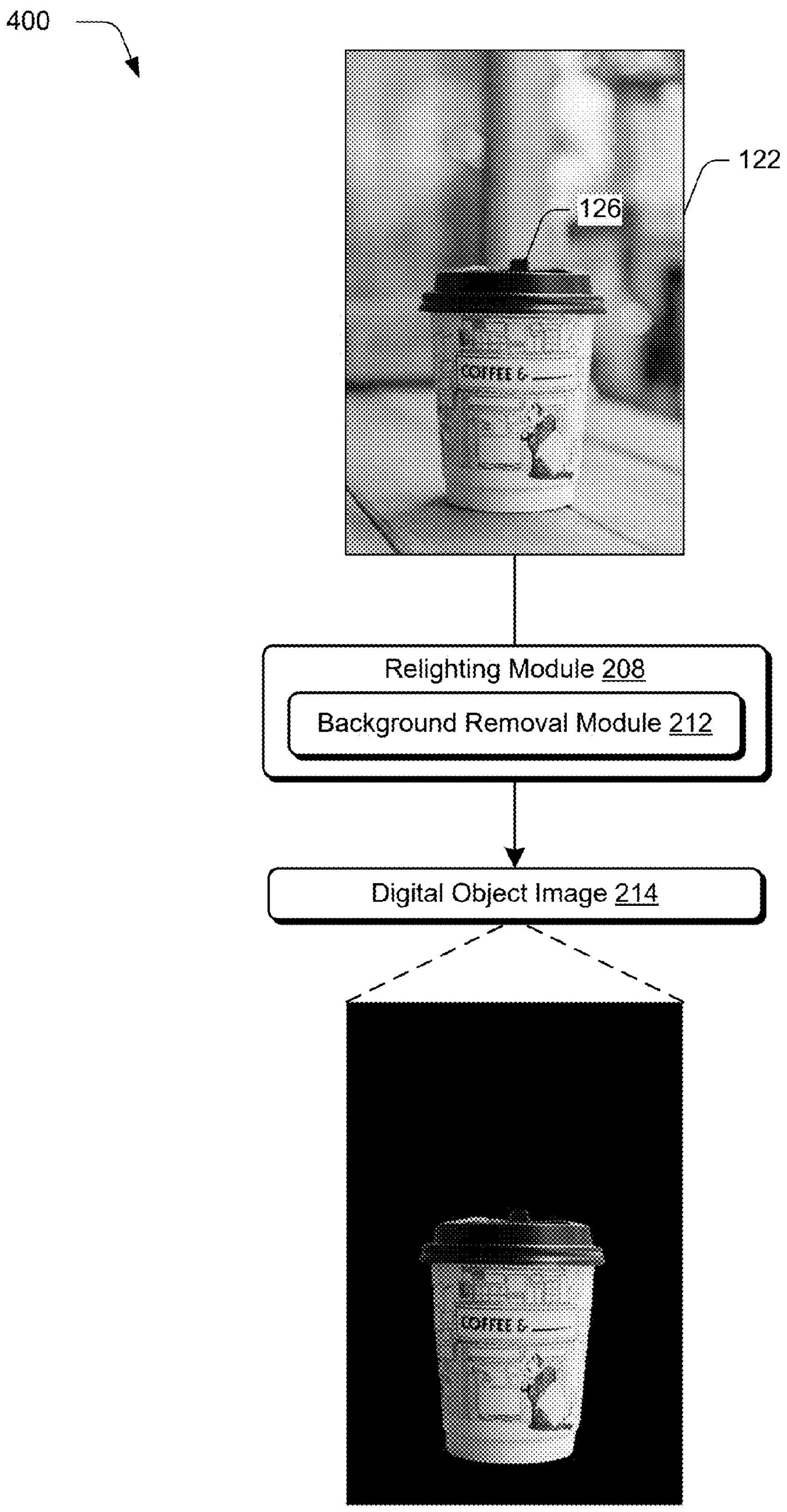
FIG. 4 depicts an example of functionality of a background removal module to extract a digital object from a digital image.

FIG. 4 depicts an example 400 of functionality of the background removal module 212 to extract the digital object 126 from the digital image 122. The example 400, for instance, is a continuation of the example 300 discussed above with respect to FIG. 3 and further continued below with respect to FIGS. 5-9. In the illustrated example, for instance, the edit module 116 receives the digital image 122, which in this example depicts a coffee cup. The coffee cup is representative of the digital object 126 and includes an intricate design, a logo that includes text, and is depicted as resting on a wooden table in a coffee shop.

As part of generating the relit digital object 210, the relighting module 208 includes a background removal module 212. The background removal module 212 receives the digital image 122 as input and removes the background to extract the digital object 126. In this example, the extracted digital object 126 is represented as the digital object image 214. The digital object image 214, for instance, depicts the coffee cup with the wooden table and coffee shop removed.

The relighting module 208 further includes a recoloring module 216 that is operable to generate a lighting example image 218 that has the lighting condition applied to a coarse representation of the digital object 126 (block 1104). Generally, the lighting example image 218 depicts a representation (e.g., a low-resolution or a "coarse" representation) of the digital object 126 with the lighting condition applied. This is by way of example and not limitation, and in additional or alternative examples, the lighting example image 218 has a same or similar resolution as the digital image 122. In an example, the recoloring module 216 receives as input the extracted digital object 126, e.g., the digital object image 214, and applies the lighting condition specified by the lighting prompt 202 to the digital object 126 to generate the lighting example image 218.

Applying the lighting condition, for instance, includes "relighting" the extracted digital object 126 by adjusting a variety of visual factors to simulate the target lighting conditions. For instance, the recoloring module 216 edits one or more of a brightness, intensity, color, temperature, direction and/or angle of light, shadows, highlights, reflections, ambient light, global illumination, material properties, etc. of the digital object image 214 as part of generating the lighting example image 218.

In various implementations, the recoloring module 216 leverages a generative AI model to relight the digital object 126 under the specified lighting conditions. In some implementations, the generative AI model is a stable diffusion model that is fine-tuned for image editing including relighting operations. This is by way of example and not limitation, and the recoloring module 216 is operable to implement one or more of a variety of modalities for relighting operations, such as various applications, machine learning models such as a pix2pix conditional GAN, etc.

In various implementations, the recoloring module 216 generates a plurality of lighting example images 218. For example, the recoloring module 216 generates several lighting example images 218 which are output for display in a user interface 110. A user of the computing device 102 can then select one or more of the lighting example images 218 with which the edit module 116 generates the edited digital image 118. In this way, the techniques described herein expand creative options for content creators.

Figure 5:
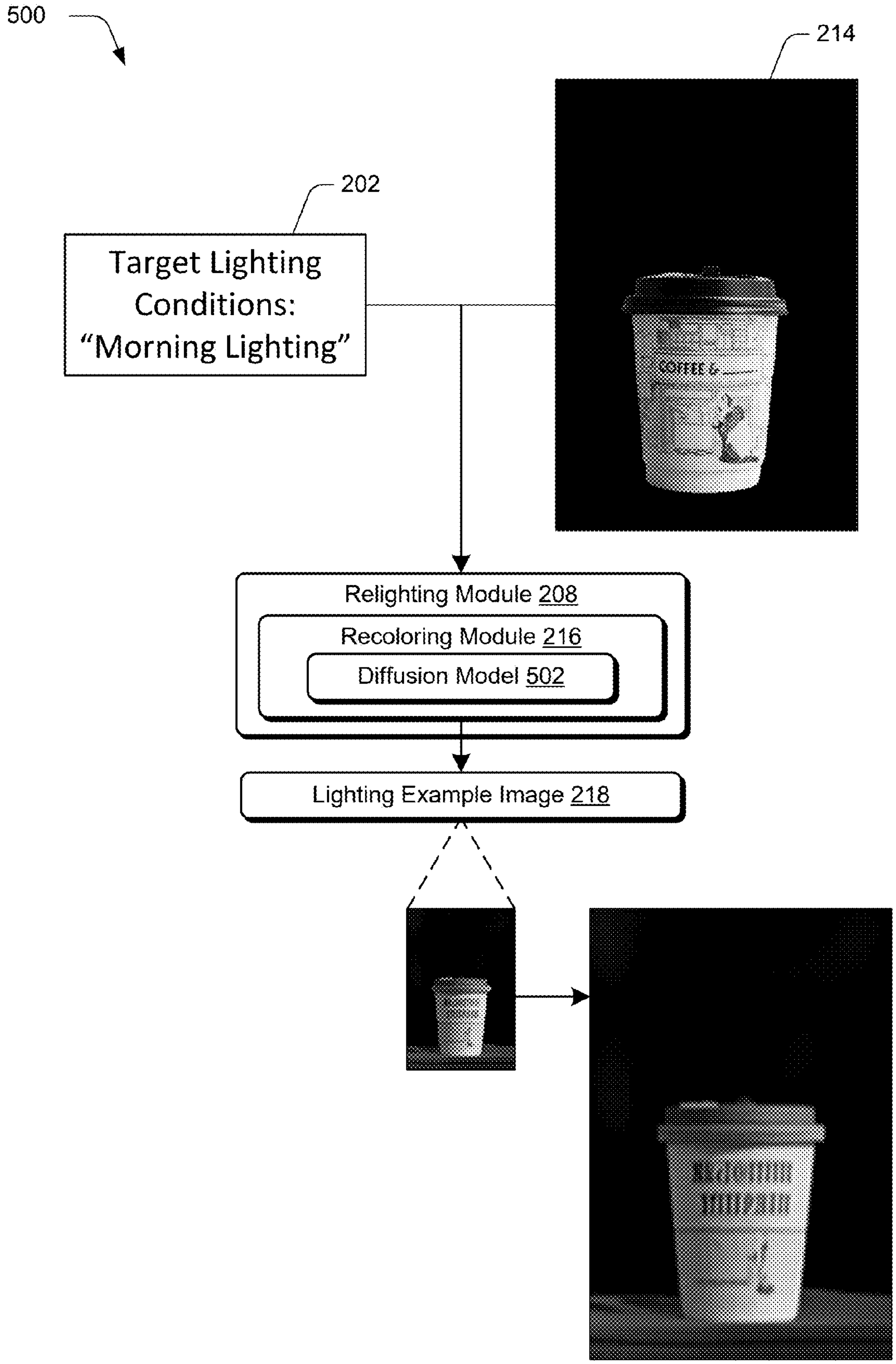
FIG. 5 depicts an example of relighting a digital object to generate a lighting example image.

FIG. 5 depicts an example 500 of relighting the digital object 126 to generate a lighting example image 218. The example 500 is a continuation of the example described above in FIGS. 3 and 4. In the illustrated example 500, the recoloring module 216 receives as input the digital object image 214 that depicts the extracted digital object 126 as well as the lighting prompt 202 generated in accordance with the techniques described above.

Based on the lighting prompt 202 and the digital object image 214, the recoloring module 216 leverages a diffusion model 502 to generate the lighting example image 218. In this example, the diffusion model 502 generates the lighting example image 218 at a resolution less than the resolution of the digital object image 214, e.g., 128×128 pixels, and accordingly the recoloring module 216 is further operable to resize the lighting example image 218, such as to match a size and/or resolution of the digital object image 214 as depicted in the illustrated example. In various examples, generation of the lighting example image 218 additionally includes removal of a background of the lighting example image 218, such as by using one or more of the techniques described above with respect to the background removal module 212.

As illustrated, the lighting example image 218 includes a coarse representation of the digital object 126 with the lighting condition of "morning lighting" applied. For instance, a color profile of the coffee cup has changed in accordance with the lighting condition. Notably, a color of the text and a color of the lid of the coffee cup appear lighter in the lighting example image 218.

In this example, the diffusion model 502 is effective to apply the target lighting condition, however content details of the digital object 126 are lost. For instance, while the overall shape of the coffee cup is maintained, fine details such as the particular pattern on the coffee cup, the text, and the logo are significantly distorted.

To address these issues and restore content details to the digital object 126, the relighting module 208 further includes a harmonization module 220 to apply a color profile from the lighting example image 218 to the digital object to generate the relit digital object 210 (block 1106). As described above, the lighting example image 218 accurately includes the desired lighting condition, however in one or more examples the lighting example image 218 has a lower resolution than the digital image 122 and/or includes visual artifacts such as distortions to fine details of the digital object 126. Accordingly, the harmonization module 220 is operable to restore content details to the digital object 126, such as through implementation of a histogram matching operation.

In an example to do so, the harmonization module 220 generates a first cumulative distribution function for the digital object image 214 and a second cumulative distribution function for the lighting example image 218. The first and second cumulative distribution functions, for instance, represent pixel intensities of the respective images. Accordingly, the harmonization module 220 generates a mapping between the first cumulative distribution function and the second cumulative distribution function. Based on the mapping, the harmonization module 220 transfers one or more visual properties, e.g., a color profile, from the lighting example image 218 to the digital object 126.

In an example, the histogram matching operation is performed in an RGB (red, green, blue) color space to transfer a color profile from the lighting example image 218 to the digital object 126. Alternatively or additionally, the harmonization module 220 performs the histogram matching operation in one or more other color spaces, such as a CMY (cyan, magenta, yellow) color space, an HSV (hue, saturation, value), grayscale, HSL (hue, saturation, lightness), LAB/CIELAB, etc. This is by way of example and not limitation and a variety of color spaces are considered.

By way of example, the harmonization module 220 performs the histogram matching operation in an LAB color space that includes three components, i.e., three separate "channels". For instance, the LAB color space includes an L-component that represents "lightness," an A-component that represents a color value on a green to red axis, and a B-component that represents a color value on a blue to yellow axis. Accordingly, the harmonization module 220 is operable to perform the histogram matching operation between one or more of the components within the LAB space. For instance, the harmonization module 220 performs the histogram matching operation for the L-component alone, while keeping the color components, e.g., the A-component and B-component, constant. In this way, the harmonization module 220 is able to transfer a lighting component from the lighting example image 218 to the digital object 126 while keeping one or more of the color components constant. This increases creative capabilities when generating the edited digital image 118.

Figure 6:
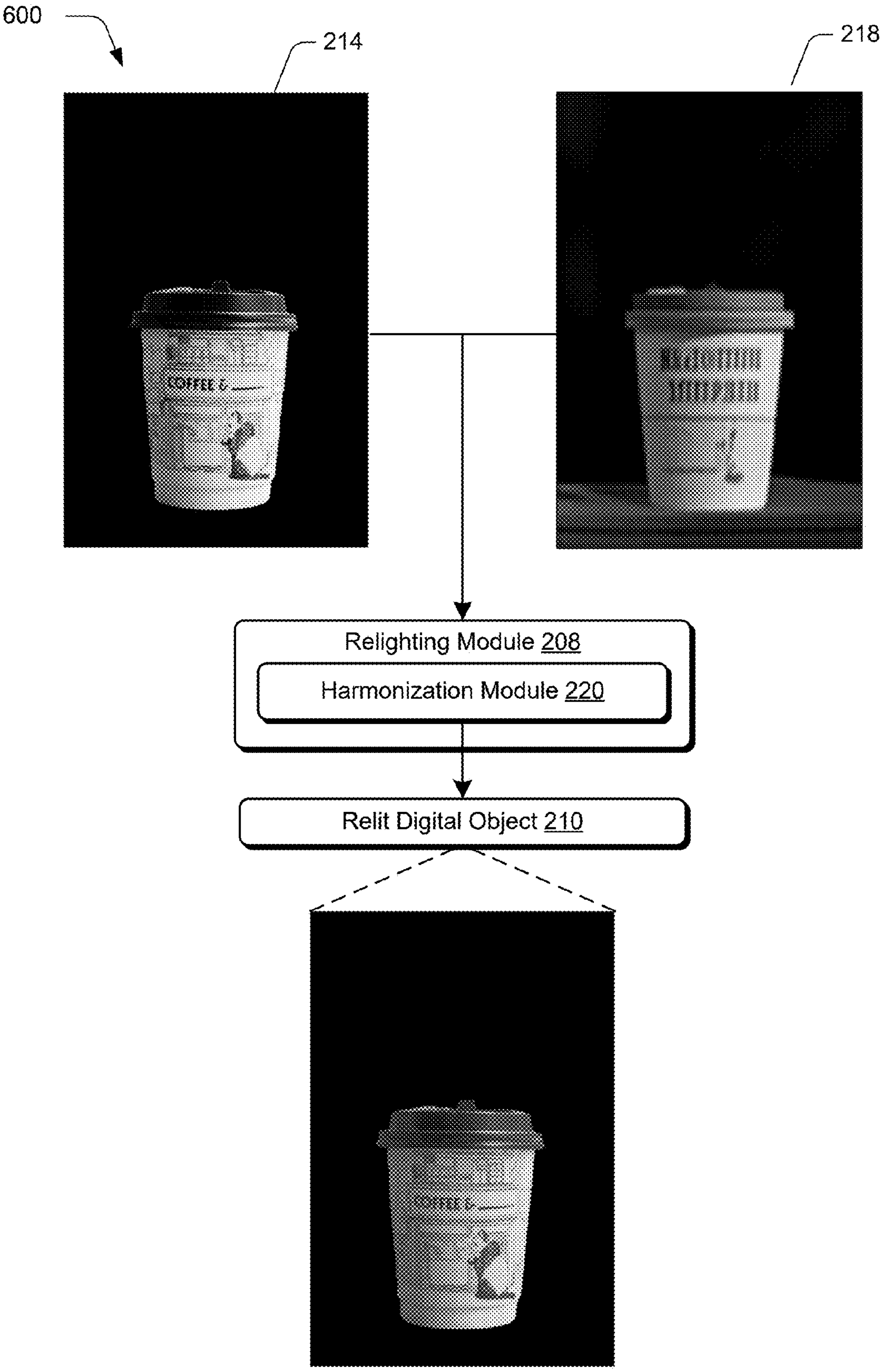
FIG. 6 depicts an example of a histogram matching approach between an extracted digital object and a lighting example image.

FIG. 6 depicts an example 600 of a histogram matching approach between the extracted digital object, e.g., the digital object image 214, and the lighting example image 218. The example 600 is a continuation of the example described above in FIGS. 3-5. In the illustrated example, the relighting module 208 includes a harmonization module 220 that receives as input the digital object image 214 and the lighting example image 218. As described above, the digital object image 214 has a resolution similar and/or the same as that of the digital image 122 and includes fine content details of the coffee cup. The lighting example image 218 depicts a coarse representation of the coffee cup with the lighting condition applied, however includes several visual artifacts such as distortions to the text and logo.

In accordance with the techniques described above, the harmonization module 220 is operable to transfer a color profile associated with the lighting example image 218 to the high-resolution representation of the coffee cup present in the digital object image 214. In this way, the harmonization module 220 is operable to generate and/or produce the relit digital object 210 that has the lighting conditions of the lighting example image 218 applied to a high-fidelity representation of the digital object 126, which overcomes conventional limitations that either prevent edits to the underlying image or distort content details of the underlying image.

In one or more examples, the edit module 116 outputs the relit digital object 210 for display, such as in a user interface 110 of a display device 112. In some implementations, the edit module 116 outputs multiple relit digital objects 210 that are each based on the lighting condition and the digital image 122. Thus, the techniques described herein support generation of several "options" that are selectable, such as by a user, for display and/or further editing.

The edit module 116 further includes a scene module 222 that is operable to generate a scene that includes a background 224 having one or more features specified by the background condition included in the background prompt 204 (block 1006). Generally, the features are characterized by one or more objects, environmental/geographical depictions, color palettes, individuals, animals, textures, depth of field, perspective, style, scale, atmosphere, composition, tone, weather, time of day/year, etc. that contribute to the scene. This is by way of example and not limitation, and a variety of scene features are considered. In various examples, the background 224 is further based on the lighting prompt 202 and/or the relit digital object 210.

To generate the background 224, the scene module 222 leverages a generative fill model. In one or more examples, the generative fill model is an outpainting model (e.g., a Generative Fill multi-diffusion model) that is configured to perform text-guided background outpainting, such as to "fill in" the background 224 based on the background prompt 204. In an example, the scene module 222 fills in the background 224 with the relit digital object 210 included. The generative fill model as described herein considers the lighting effects applied to the relit digital object 210, which overcomes the limitations of conventional text-based background synthesis approaches that do not consider lighting effects of objects to be included in an image with the background, and thus generate unrealistic images.

Figure 7:
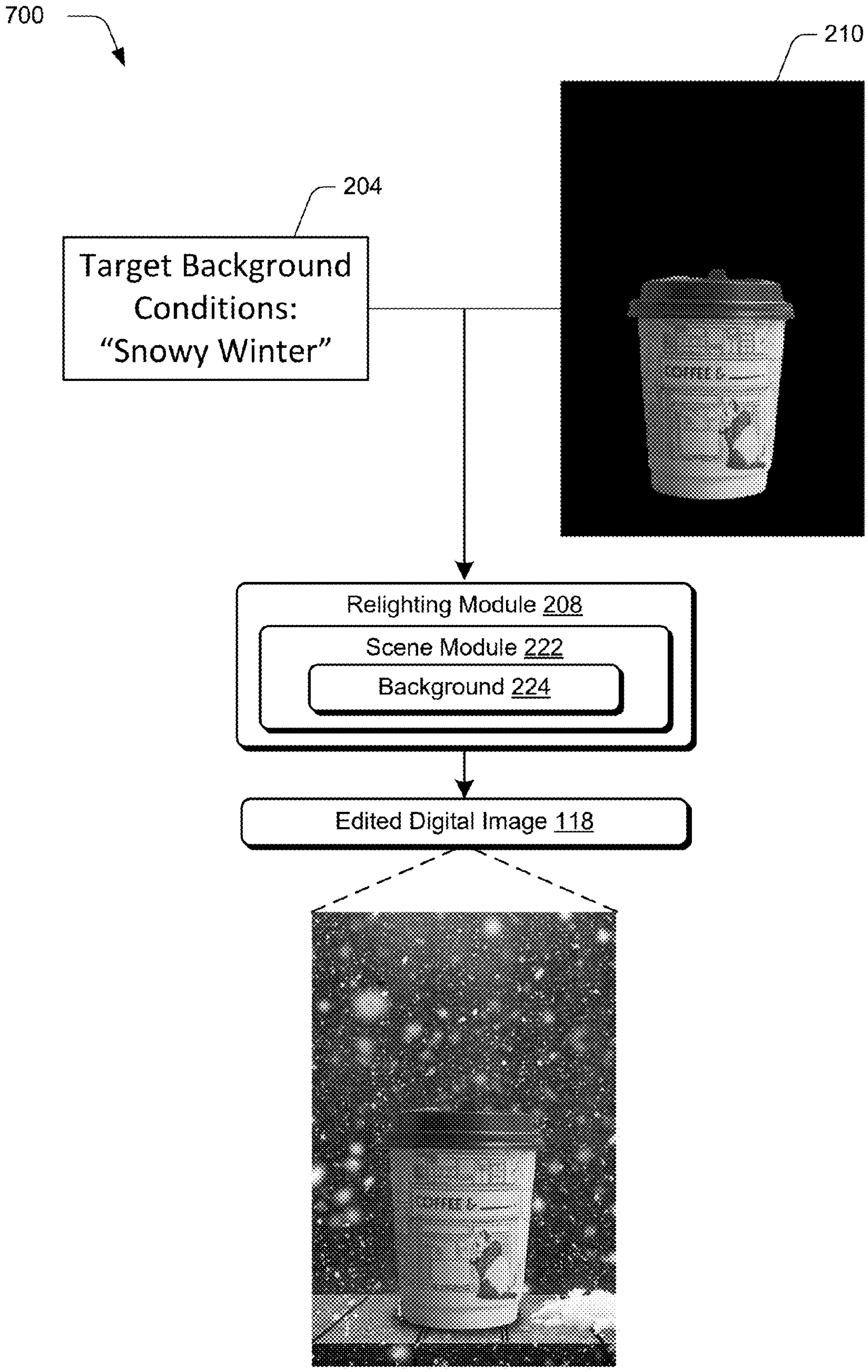
FIG. 7 depicts an example to generate a background to be included in an edited digital image along with a relit digital object.

FIG. 7 depicts an example 700 to generate a background 224 to be included in an edited digital image 118 along with a relit digital object 210. The example 700 is a continuation of the example described above in FIGS. 3-6. In this example, the relighting module 208 includes a scene module 222 that receives as input a background condition specified by the background prompt 204, e.g., "snowy winter" conditions, as well as the relit digital object 210.

Based on the background condition and the relit digital object 210, the scene module 222 synthesizes the background 224 to include features specified by the background condition and lighting conditions that match the lighting conditions of the relit digital object 210. Because the relit digital object 210 includes the lighting conditions specified by the lighting prompt 202, the background 224 further includes the same or similar lighting conditions as well. The edit module 116 combines the background 224 and the relit digital object 210 to generate the edited digital image 118. As illustrated, the background 224 includes various features based on the "snowy winter" background prompt 204, such as falling snow, a particular color scheme that is in accordance with the background condition, snow resting on a table, etc. The background 224 further includes lighting effects that are based in part on the relit digital object 210.

Once generated, the edit module 116 is operable to output the edited digital image 118 that includes the relit digital object 210 and the background 224 (block 1008). As depicted in FIG. 7, the edited digital image 118 includes a high-fidelity representation of the relit digital object 210 with fine details preserved under the lighting conditions specified by the lighting prompt 202. The edited digital image 118 further includes the background 224 that includes features based on the background prompt 204, the lighting prompt 202, and the relit digital object 210.

In some examples, the edit module 116 includes a shadow module 226 that is operable to apply and/or edit one or more shadows within the edited digital image 118. For instance, the shadow module 226 leverages a shadow synthesis model to add a shadow to the edited digital image 118, remove a shadow from the edited digital image 118, or edit an existing shadow within the edited digital image 118. The shadow module 226, for instance, is operable to increase or decrease a brightness of a shadow, adjust contrast between shadowed and non-shadowed areas, adjust a color of a shadow, account for multiple light sources within a scene, etc.

In one or more examples, the shadow module 226 edits a shadow based on a user input, e.g., based on a request to edit one or more shadows in a particular way. Alternatively or additionally, the shadow module 226 edits shadows of the edited digital image 118 automatically and without user intervention. In one example, the shadow module 226 detects one or more light sources within the edited digital image 118 and edits a shadow based on a location and/or intensity of the detected light sources. The shadow module 226 is further operable to edit shadows based on other objects included in the edited digital image 118, such as based on light interactions between multiple digital objects 126.

Figure 8:
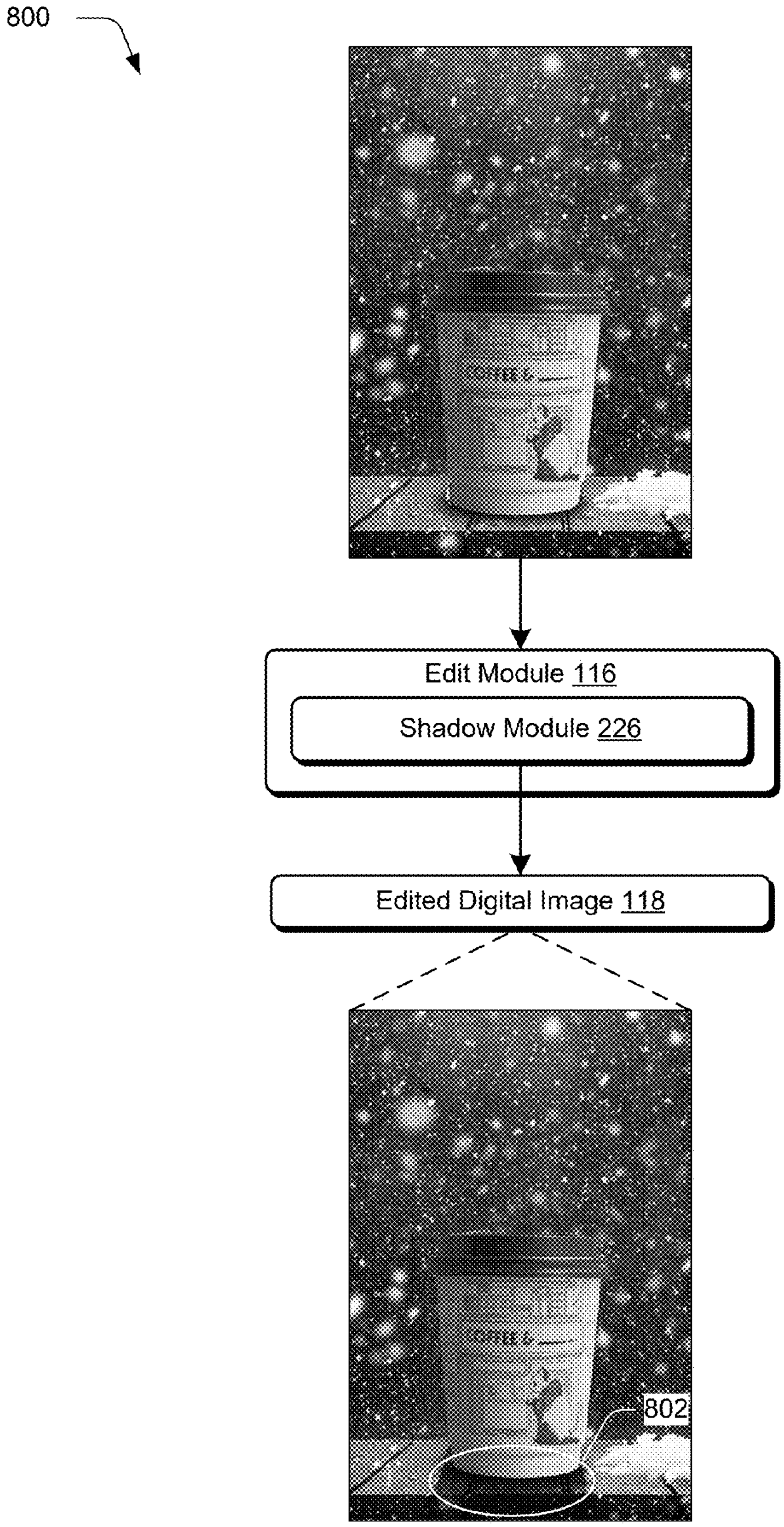
FIG. 8 depicts an example of operation of a shadow module to add a shadow to an edited digital image.

FIG. 8 depicts an example 800 of operation of the shadow module 226 to add a shadow to the edited digital image 118. The example 800 is a continuation of the example described above in FIGS. 3-7. In this example, the shadow module 226 receives as input an image, such as the edited digital image 118 of FIG. 7 that depicts the coffee cup in a snowy winter scene. The shadow module 226 generates a shadow 802 "in front of" the coffee cup automatically and without user intervention based on features of the edited digital image 118, such as a light source detected "behind" the coffee cup. In this way, the techniques described herein support increased realism when generating the edited digital image 118 and overcome the limitations of conventional techniques that prevent alterations to digital objects, cause distortions to the digital objects, rely on multiple input images and/or are computationally expensive.

Figure 9:
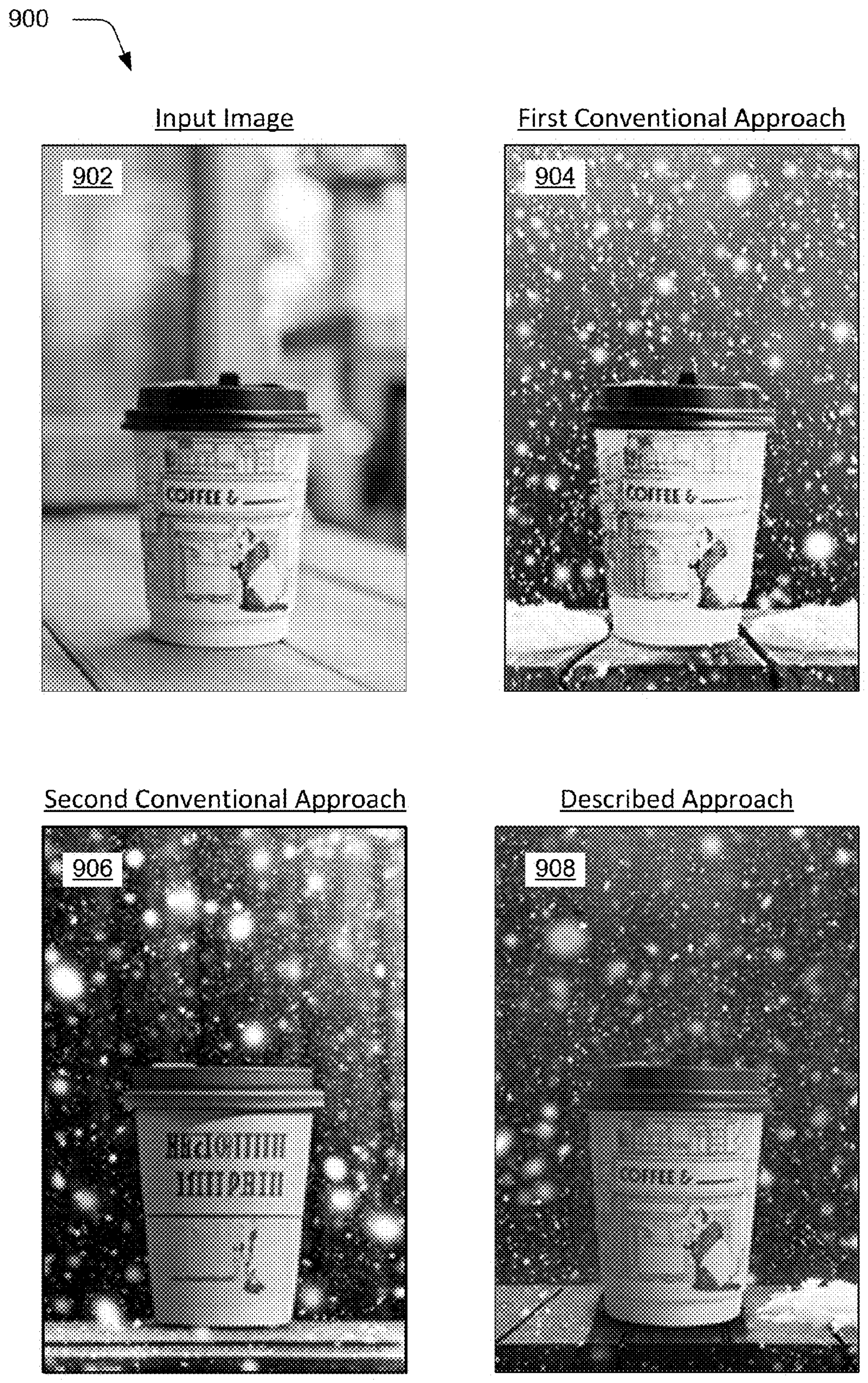
FIG. 9 depicts an example of a comparison of conventional approaches for text-based background editing to the techniques described herein.
Figure 10:
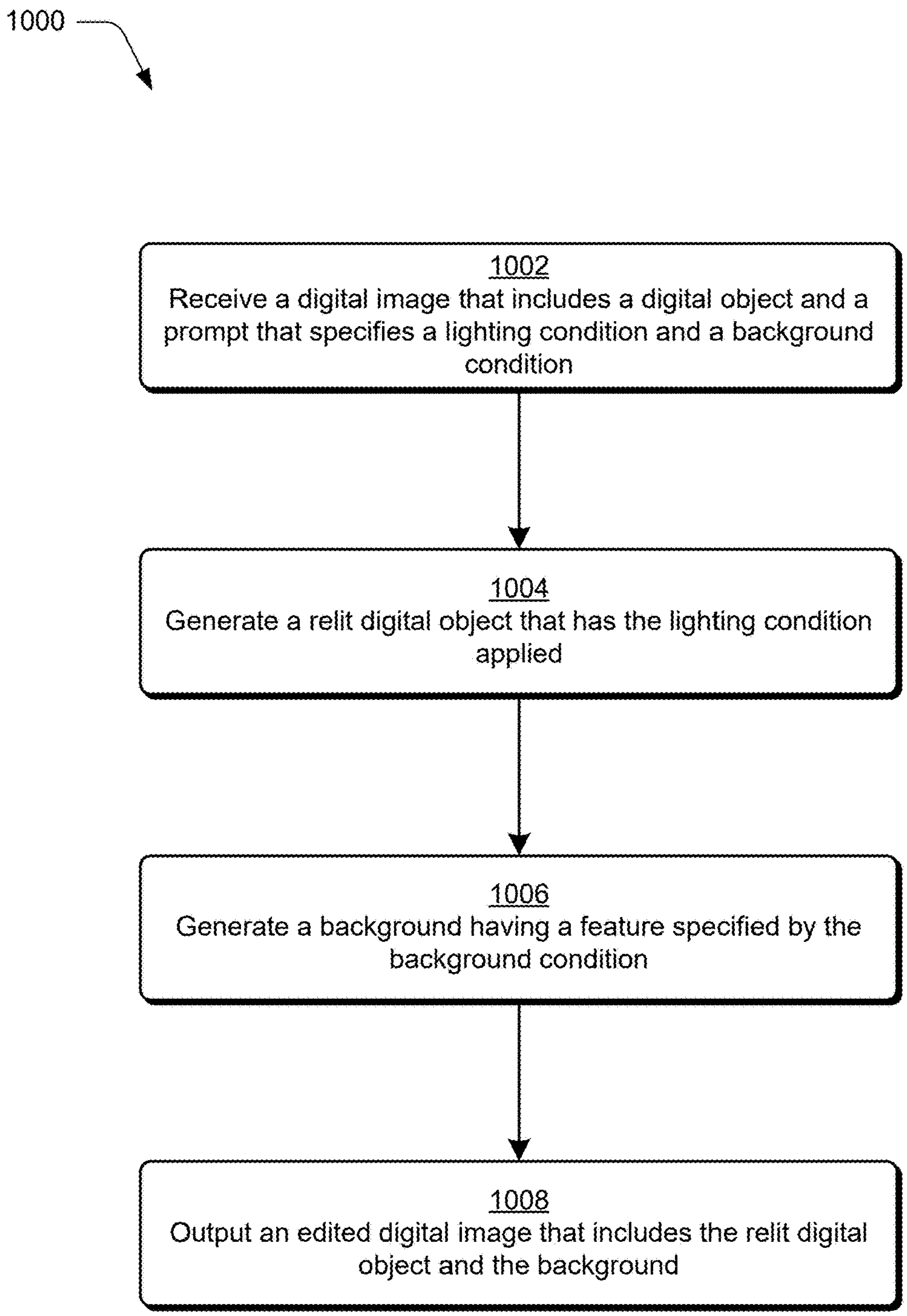
FIG. 10 is a flow diagram depicting an algorithm as a step-by-step procedure in an example implementation that is performable by a processing device to generate an edited digital image.

For instance, FIG. 9 depicts an example 900 of a comparison of conventional approaches for text-based background editing to the techniques described herein in a first image 902, a second image 904, a third image 906, and a fourth image 908. The first image 902 represents an input image, such as the digital image 122 in the example depicted above with respect to FIGS. 3-8. The second image 904 represents a first conventional approach to perform text-based background editing to the first image 902, the third image 906 represents a second conventional approach to perform text-based background editing to the first image 902, and the fourth image 908 represents an edited digital image 118 generated based on the first image 902 using the techniques described herein.

The first conventional approach, for instance, prohibits changes to the coffee cup when generating the second image 904. Accordingly, the second image 904 includes noticeable disparities between the coffee cup and the surrounding scene. for instance, lighting effects between the background and the coffee cup do not match. Accordingly, the coffee cup looks "out-of-place" in the second image 904.

As depicted in the third image 906, the second conventional approach (which represents a conventional generative AI editing technique) fails to preserve fine details of the coffee cup. For instance, the third image 906 exhibits distortions to details of the coffee cup such as a different lid shape, incorrect text, and a distorted logo. Thus, conventional approaches fail to accurately generate an image that maintains details of the coffee cup and includes realistic lighting and background conditions.

The fourth image 908, on the other hand, represents an edited digital image 118 generated in accordance with the techniques described herein based on the first image 902. Accordingly, the fourth image 908 depicts a high-fidelity representation of the coffee cup with realistic lighting, background, and shadowing features which is not possible using conventional techniques. The techniques described herein are further effective using a single input image, which represents an improvement over conventional approaches that require multiple input images and use significant computational resources.

Example System and Device

Figure 12:
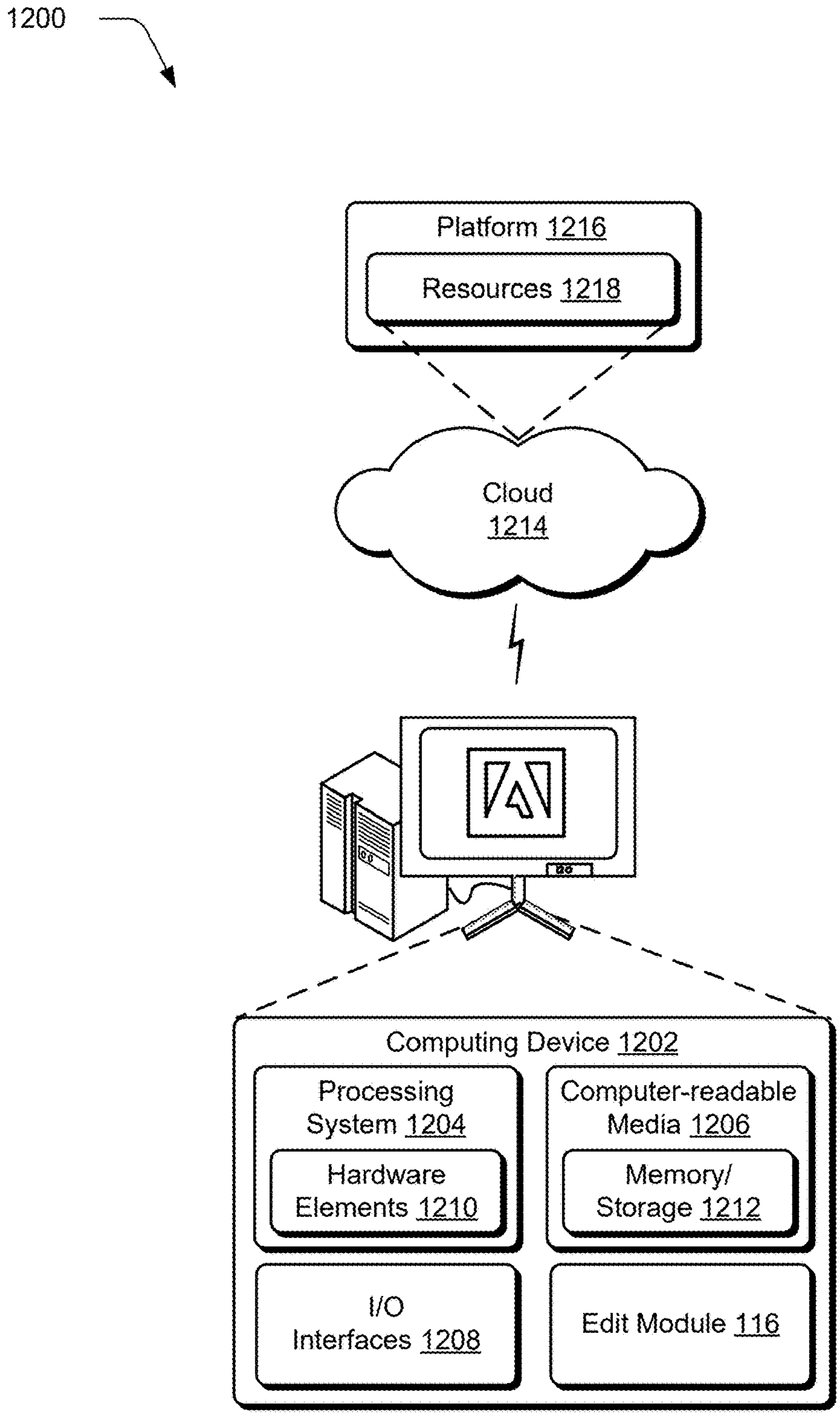
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the edit module 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a digital image that depicts a digital object, a lighting prompt, and a background prompt;

generating, by the processing device, a relit digital object by applying a lighting condition specified by the lighting prompt to the digital object;

generating, by the processing device and based on processing of the background prompt and the relit digital object by a model, a background having a feature specified by the background prompt and the lighting condition represented by the relit digital object; and outputting, by the processing device and for display in a user interface, an edited digital image that includes the relit digital object and the background.

2. The method as described in claim 1, further comprising editing one or more shadows within the edited digital image using a shadow synthesis model.

3. The method as described in claim 1, wherein the generating the relit digital object includes removing a background of the digital image to extract the digital object and using a diffusion model to generate a lighting example image that depicts a coarse representation of the digital object with the lighting condition applied.

4. The method as described in claim 3, wherein the lighting example image includes one or more visual artifacts, and generating the relit digital object further includes preserving content details of the digital object by performing a histogram matching operation.

5. The method as described in claim 4, wherein the histogram matching operation is performed in an RGB color space to transfer a color profile from the lighting example image to the extracted digital object.

6. The method as described in claim 1, further comprising receiving a text-based prompt and generating, automatically and without user intervention, the lighting prompt and the background prompt from the text-based prompt.

7. The method as described in claim 1, further comprising receiving one or more keywords and generating, automatically and without user intervention using a language model, the lighting prompt and the background prompt based on the one or more keywords.

8. The method as described in claim 1, wherein the model is a multi-diffusion model configured to consider lighting effects applied to the relit digital object during performance of text-based background outpainting.

9. A system comprising:

a memory component; and a processing device coupled to the memory component, the processing device to perform operations including:

receiving a digital image that depicts a digital object, and a prompt that specifies a lighting condition and a background condition to be applied to the digital object;

generating a relit digital object by:

applying the lighting condition to the digital object using a diffusion model; and restoring content details to the digital object using a histogram matching operation to generate the relit digital object with the lighting condition applied at a resolution of the digital image;

generating, using a generative fill model conditioned on the background condition and the relit digital object, a background that visually depicts a feature specified by the background condition and includes the lighting condition of the relit digital object; and outputting an edited digital image that depicts the relit digital object with the background and preserves content details of the digital object present in the digital image.

10. The system as described in claim 9, wherein generating the relit digital object includes extracting the digital object from the digital image and using the diffusion model to generate a lighting example image that depicts a coarse representation of the digital object with the lighting condition applied.

11. The system as described in claim 10, wherein the lighting example image has a lower resolution than the digital image, and generating the relit digital object includes using the histogram matching operation to transfer a color profile from the lighting example image to the extracted digital object, the relit digital object having a resolution of the digital image.

12. The system as described in claim 10, wherein the histogram matching operation is performed in a LAB color space to transfer a lighting component from the lighting example image to the digital object and keep one or more color components constant.

13. The system as described in claim 9, the operations further comprising editing one or more shadows within the edited digital image using a shadow synthesis model.

14. The system as described in claim 13, wherein the shadow synthesis model adds a shadow to the edited digital image, removes a shadow from the edited digital image, or edits an existing shadow within the edited digital image.

15. The system as described in claim 9, wherein the generative fill model is a multi-diffusion model configured to consider lighting effects applied to the relit digital object during performance of text-based background outpainting.

16. A non-transitory computer-readable storage medium storing executable instructions, which when executed by a processing device, cause the processing device to perform operations comprising:

receiving a digital image that depicts a digital object and a lighting prompt that specifies a lighting condition to be applied to the digital object;

generating a relit digital object that has the lighting condition applied to the digital object, the relit digital object generated by:

generating a digital object image that depicts the digital object by removing a background from the digital image to extract the digital object from the digital image without a decrease in fidelity;

generating, using the digital object image, a lighting example image that depicts a coarse representation of the digital object with the lighting condition applied; and transferring a color profile of the coarse representation of the digital object to the digital object image by performing a histogram matching operation between the digital object image and the lighting example image to generate the relit digital object at a resolution of the digital object image; and outputting the relit digital object for display in a user interface.

17. The non-transitory computer-readable storage medium as described in claim 16, the operations further comprising receiving a background prompt, generating a background by processing the background prompt and the relit digital object using a generative fill model, and generating an edited digital image that includes the relit digital object and the generated background.

18. The non-transitory computer-readable storage medium as described in claim 17, the operations further comprising editing one or more shadows within the edited digital image using a shadow synthesis model.

19. The non-transitory computer-readable storage medium as described in claim 16, wherein the histogram matching operation includes calculating a first cumulative distribution function for the digital object image and a second cumulative distribution function for the lighting example image and generating a mapping between the first cumulative distribution function and the second cumulative distribution function.

20. The non-transitory computer-readable storage medium as described in claim 19, wherein the color profile is transferred from the lighting example image to the digital object image based on the mapping between the first cumulative distribution function and the second cumulative distribution function.

* * * * *